United States Patent [19]
Giglietti

[11] Patent Number: 5,325,621
[45] Date of Patent: Jul. 5, 1994

[54] ANIMAL TRAP

[76] Inventor: Joseph N. Giglietti, 202 N. Center St., Joliet, Ill. 60433

[21] Appl. No.: 71,587

[22] Filed: Jun. 2, 1993

[51] Int. Cl.⁵ ............................................. A01M 23/08
[52] U.S. Cl. ......................................................... 43/61
[58] Field of Search ................... 43/61, 73, 66, 63, 64, 43/131

[56] References Cited

U.S. PATENT DOCUMENTS

| | | | |
|---|---|---|---|
| 3,984,936 | 10/1976 | Camp | 43/60 |
| 4,468,883 | 9/1984 | Williams | 43/61 |
| 4,782,621 | 11/1988 | Wissman | 43/131 |
| 4,831,766 | 5/1989 | Giglietti | 43/61 |
| 4,984,382 | 1/1991 | Yost | 43/61 |
| 4,998,376 | 3/1991 | Scherabak | 43/61 |
| 5,050,336 | 9/1991 | Paassen | 43/61 |
| 5,067,271 | 11/1991 | Henning | 43/60 |

Primary Examiner—P. Austin Bradley
Assistant Examiner—Jeanne M. Elpel
Attorney, Agent, or Firm—Speckman, Pauley & Fejer

[57] ABSTRACT

A preset animal trap comprising at least one side wall defining a chamber closed off on the top by a removable top end wall and on the bottom by a bottom end wall. The side wall forms an entrance hole larger than the size of the animal to be trapped. A resilient trap door is secured to the inside surface of the side wall and conforms to said inside surface such that, in a closed position, it is flush against the inside surface of the side wall and completely covers the entrance hole. The open end of the trap door is surrounded by a frame member secured to the inside surface of the side wall to inhibit the trap door from being opened from inside the chamber.

8 Claims, 2 Drawing Sheets

ANIMAL TRAP

BACKGROUND OF THE INVENTION

1. Field of the Invention

This invention relates to an animal trap, such as a mouse or rat trap, which is sanitarily disposable without touching the bait or captured rodent and is not susceptible to tripping by or injury to children, cats, dogs and the like. The animal trap of this invention is a closed container having a resilient trap door secured to an inside surface of the side wall of the container and conforming to the inside surface of the side wall such that, in a closed position, it completely covers the entrance hole through which the animal to be trapped enters the container. Means for preventing the animal from opening the trap door from within the container are also provided.

2. Description of Prior Art

Widely used rodent traps having dangerously exposed spring action mechanisms are well known. Disadvantages of these traps include their danger to children, cats and dogs, as well as their unsightly, insanitary, and generally unpleasant appearance, especially when occupied. Various attempts have been made to provide enclosed animal traps which overcome the above disadvantages and, in some cases, to provide a closed container for sanitary disposal.

Such an animal trap is disclosed by my own U.S. Pat. No. 4,831,766 which teaches an animal trap in the form of a closed container having a door opening and a mating inwardly opening door hingedly mounted to the side wall of the container with a bias spring urging the door to a normally closed position to provide a closed trap.

U.S. Pat. No. 5,050,336 teaches a disposable animal trap in the form of a thin-walled closed container of resilient plastic having a door flap formed in the surrounding wall by slits with a portion of the wall adjacent the wall being integrally attached to the door flaps so that the resiliency of the plastic allows the door to be bent inwardly to an animal admitting condition but which is normally biased to a closed condition in which it is flush with the surrounding wall. This patent further teaches that the slits can be formed in a molding process or can be cut after the enclosure is removed from a mold. This patent also teaches various shapes of such trap door.

U.S. Pat. No. 4,998,376 teaches an enclosed insect trap having a lightweight base and a lightweight cover formed of a flexible sheet material. The cover is affixed along portions of the base's continuous edge and includes flap portions folded between the cover and base. The cover is affixed to the base such that the fold between each flap portion and the cover is arched upwardly away from the base to create a downward biasing force on each flap portion. This biasing force returns the flap portion into contact with the base once an insect has lifted the flap to enter the trap.

U.S. Pat. No. 4,468,883 teaches a mouse trap in the form of a closed container having a hinged door which is spring loaded to maintain the door in a closed position. Magnetic or spring means are provided for holding the door in the closed position. U.S. Pat. No. 5,067,271 teaches a grated trap door which is attachable to a receptacle, such as a glass jar, which operates in a vertical direction, pivoting between the open and closed positions. Similarly, U.S. Pat. No. 3,984,936 teaches a disposable trap for animals such as mice having a cap assembly which is adapted to fit over one end of a receptacle, such as a beverage can. The cap assembly includes a flanged end plate having an entrance opening in a lower portion thereof and an opening cover. The opening cover has a lower portion which covers the opening in the end plate and overlaps the end plate around the opening to form a one-way door. A narrow elongate upper portion functions as a leaf spring to urge the lower portion to cover the end plate opening after the animal has entered the trap.

U.S. Pat. No. 4,984,382 teaches an animal trap in the form of a cage having a weight activated mechanism for trapping the animal within the cage.

SUMMARY OF THE INVENTION

It is an object of this invention to provide a safe, sanitary, disposable animal trap.

It is a further object of this invention to provide an animal trap having a normally closed inwardly opening door in a side wall for entry of the animal to be trapped, allowing closing of the door after entry of the animal.

It is a further object of this invention to provide an animal trap having a normally closed inwardly opening door which cannot be opened by the animal from within the trap.

It is yet another object of this invention to provide a closed container animal trap having a close-fitting door in the closed position so that insufficient air is provided for extended animal life within the trap.

It is still another object of this invention to provide a trap having means for visually determining occupancy of the trap without touching the trap.

It is yet another object of this invention to provide an animal trap whereby complete disposal of the trap, bait and animal is achieved without touching the animal or bait.

It is yet another object of this invention to provide a simple animal trap design which may be economically manufactured for complete disposal after a single use.

These and other objects of this invention are achieved by a preset animal trap in accordance with one embodiment of this invention comprising at least one side wall defining a chamber, said side wall having a top end and a bottom end and forming an entrance hole for the animal to be trapped to enter into the trap. A top end wall, preferably removable, is provided adjacent to the top end of the side wall and a bottom end wall is provided adjacent to the bottom end of the side wall, thereby forming a closed container. A resilient trap door is secured to the inside surface of the side wall, which trap door conforms to the inside surface of the side wall such that, in a closed position, the trap door completely covers the entrance hole and is flush against the inside surface of the side wall. The preset animal trap in accordance with this invention further comprises means for inhibiting the trap door from being opened from inside the chamber, thereby preventing the trapped animal from opening the trap door and escaping through the entrance hole. A spiral-shaped inner partition is disposed within the chamber having its outermost end abutting the side wall and forming a non-continuous loop pathway. The spiral-shaped inner partition forms a spiral animal pathway from the entrance hole for a distance greater than the overall length of the animal to be trapped, thereby allowing the resilient trap door to return to a fully closed position over the entrance hole.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
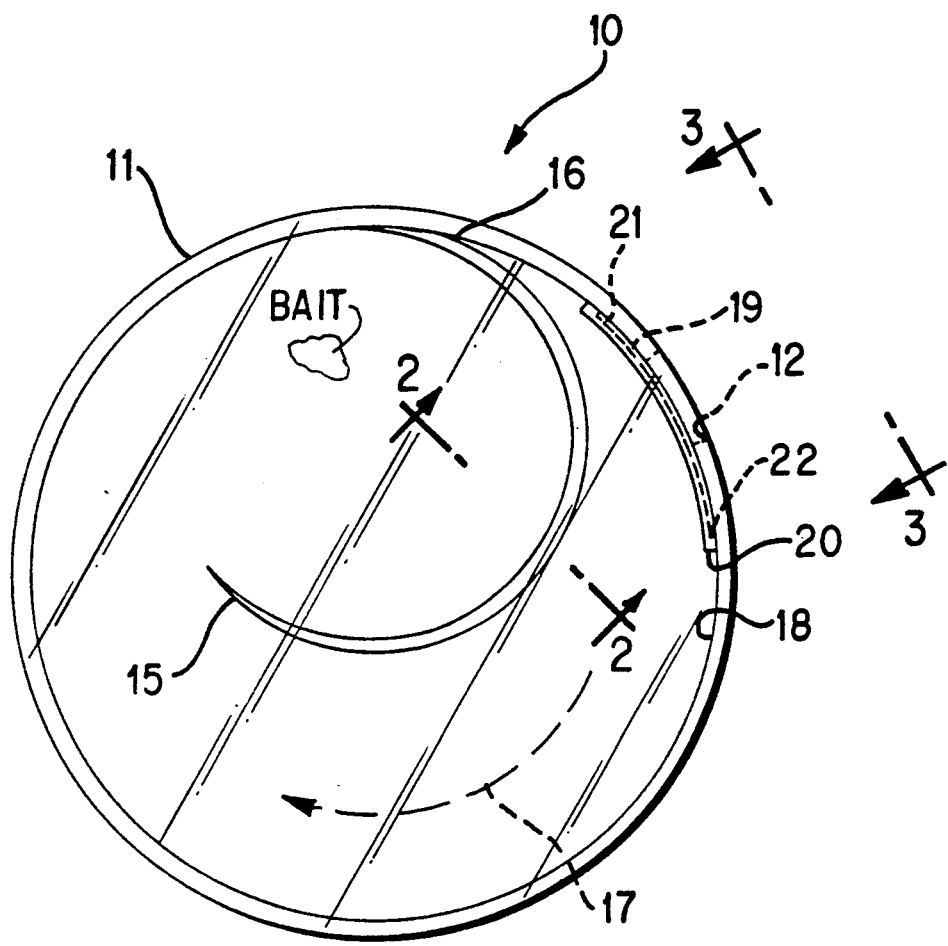
FIG. 1 is a schematic diagram of a plan view of a preset animal trap in accordance with one embodiment of this invention.

FIG. 1 shows a preset animal trap in accordance with one embodiment of this invention. Although depicted as a cylindrical container, it will be apparent to those skilled in the art that other shapes may also be utilized.

Figure 3:
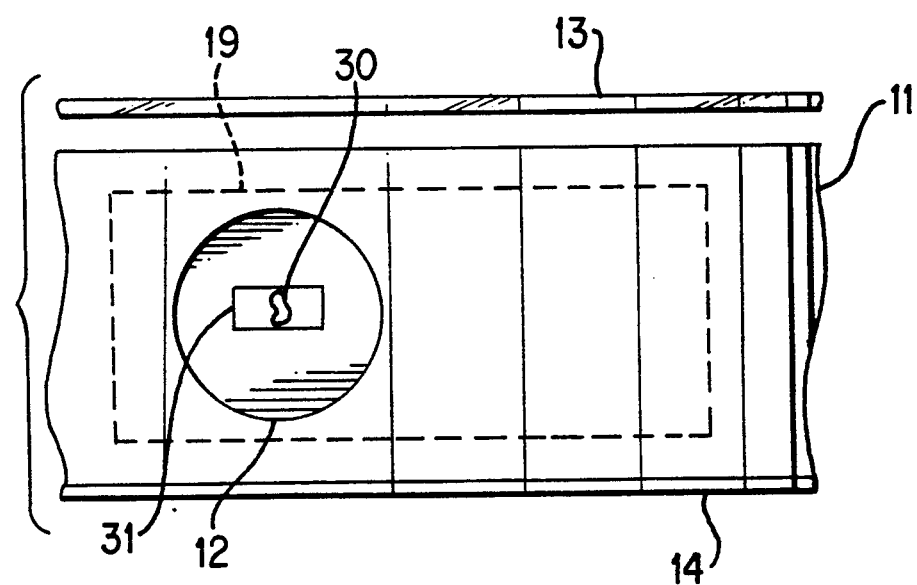
FIG. 3 is a schematic diagram of a side view of the preset animal trap shown in FIG. 1 taken along the line 3—3 and with the top removed.

Preset animal trap 10 as shown in FIG. 1 comprises side wall 11 which forms entrance hole 12 through which the animal to be trapped enters into preset animal trap 10. Adjacent the top end of side wall 11 is top end wall 13 as shown in FIG. 3. Bottom end wall 14, also as shown in FIG. 3, is disposed adjacent the bottom end of side wall 11. As a result, with the exception of entrance hole 12 in side wall 11, animal trap 10 is a completely closed container.

Disposed within animal trap 10 is spiral-shaped inner partition 15 having its outermost end 16 abutting side wall 11, forming a non-continuous loop pathway and forming a spiral animal pathway as indicated by arrow 17 from entrance hole 12 to the bait. To ensure that the animal to be trapped is fully within animal trap 10, the length of said animal pathway, that is the distance from entrance hole 12 to the bait is greater than the overall length of the animal to be trapped.

Figure 2:
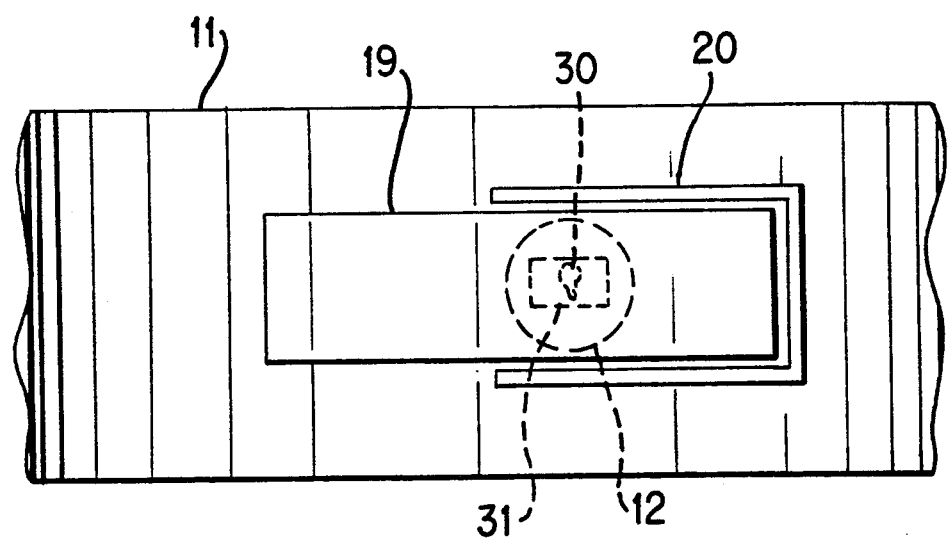
FIG. 2 is a schematic diagram of a side view of the preset animal trap shown in FIG. 1 taken along the line 2—2.

Secured to the inside surface 18 of side wall 11 is resilient trap door 19. Resilient trap door 19 conforms in shape to inside surface 18 of side wall 11 such that, in a closed position, resilient trap door 19 is flush against inside surface 18 of side wall 11 and completely covers entrance hole 12. Such relationship can clearly be seen in FIGS. 2 and 3.

Resilient trap door 19 is secured at end 21 to inside surface 18 of side wall 11 by any suitable means which permit end 22 to open inwardly into animal trap 10 as the animal to be trapped enters through entrance hole 12. Resilient trap door 19 is preferably constructed of spring steel, sheet metal or numerous other resilient materials including non-metal materials and is attached to side wall 11 by spot welding or an adhesive such that the resiliency of trap door 19 causes trap door 19 to return to a position flush against inside surface 18 of side wall 11 after the animal to be trapped has entered animal trap 10.

A critical requirement of an animal trap of the type disclosed herein is the capability of maintaining the animal within the trap once the animal has entered the trap. In accordance with one embodiment of this invention, animal trap 10 comprises means for inhibiting trap door 19 from being opened from inside animal trap 10. In particular, said means are provided so that the animal cannot reach behind end 22 of trap door 19 and, thus, claw open trap door 19. In accordance with one embodiment of this invention, said means for inhibiting trap door 19 from being opened from inside animal trap 10 comprises at least one frame member 20 disposed around the perimeter of at least unsecured end 22 of resilient trap door 19 and secured to inside surface 18 of side wall 11. In accordance with a preferred embodiment of this invention, frame member 20 is thicker than trap door 19 and may have beveled edges so that it is difficult for the animal to reach its claws between trap door 19 and inner surface 18 of side wall 11. In accordance with yet another embodiment of this invention, frame member 20 is disposed around the entire perimeter of trap door 19.

To provide means for determining the occupancy of animal trap 10 without touching animal trap 10, top wall 13 is preferably constructed of a transparent material. Thus, once the occupancy of animal trap 10 has been determined by visual inspection, the entire trap can be picked up and discarded.

The animal trap of this invention is preferably constructed of metal or plastic material which may be very inexpensively fabricated into the desired shapes, with the only restriction on materials being that at least a portion of top wall 13, as discussed above, is generally transparent. Likewise, side wall 11 and bottom wall 14 may be fabricated from metal and top wall 13 may be fabricated from a transparent plastic. In addition, in accordance with one preferred embodiment, top end wall 13 is removable as shown in FIG. 3. It is preferred that side wall 11 be opaque to visual observation of the inside of the trap by the animal desired to be trapped. Any suitable material of construction which is durable and suitable for containment of the trapped animal is suitable for use in the animal trap of this invention.

Any suitable lure and bait known to the art may be used in the trap of this invention. The only requirement is that the lure and bait be so situated within animal trap 10 so as to induce the animal to wholly enter animal trap 10, thereby permitting firm closure of normally closed trap door 19. In accordance with one embodiment of this invention, lure 30 may be attached to the exterior of trap door 19 to attract the rodent to the door. This lure, being on the exterior of the trap, may be protected by a peel strip 31 which may be removed upon placement of the trap, thereby providing a very fresh lure. A lure material may also be placed on the edge of trap door 19 or on inner surface 18 of side wall 11 adjacent trap door 19 to induce the animal to enter animal trap 10. It is also within the scope of this invention to additionally provide a bait containing poison within the trap to disable the animal once it has entered and trap door 19 has closed behind it. It is desired that trap door 19 be close fitting and allow very little or no outside air entry into animal trap 10 through entrance hole 12 so that an animal within animal trap 10 will quickly suffocate.

It will also be readily apparent to those skilled in the art that the size of the trap according to this invention may be readily adjusted for the animal desired to be trapped. Regardless of the shape of entrance hole 12, it must be of sufficient size to enable the animal to be trapped to enter into the trap. Likewise, as previously stated, inner partition 15 must form a pathway greater than the overall length of the animal to be trapped from trap door 19 to the bait position to allow closing of the normally closed trap door 19. For mice, I have found that a cylindrical trap of about 2½ inches in outer diameter, about 1½ inches high with a door of about ¾ inches in diameter with a transparent plastic top wall and opaque side walls and bottom wall is suitable.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

I claim:

1. A preset animal trap comprising:
   at least one side wall defining a chamber, said at least one side wall having a top end and a bottom end and forming an entrance hole larger then the size of an animal to be trapped;
   a top end wall adjacent said top end of said at least one side wall;
   a bottom end wall adjacent said bottom end of said at least one side wall;
   a resilient trap door secured to an inside surface of said at least one side wall, said trap door conforming to said inside surface of said at least one side wall and, in a closed position, completely covering said entrance hole;
   means for inhibiting said trap door from being opened from inside said chamber; and
   a spiral-shaped inner partition having its outermost end abutting said at least one side wall forming a non-continuous loop pathway, said spiral-shaped inner partition forming a spiral animal pathway from said entrance hole for a distance greater than an overall length of the animal to be trapped, thereby allowing said resilient trap door to return to a fully closed position over said entrance hole.

2. A preset animal trap in accordance with claim 1, wherein said means for inhibiting said trap door from being opened from inside said chamber comprises at least one frame member disposed around the perimeter of at least an unsecured end of said trap door secured to said inside surface of said at least one side wall.

3. A preset animal trap in accordance with claim 2, wherein said at least one frame member has a thickness greater than said trap door thickness.

4. A preset animal trap in accordance with claim 1, wherein said trap door is constructed of a spring steel.

5. A preset animal trap in accordance with claim 2, wherein at least one edge of said at least one frame member is beveled.

6. A preset animal trap in accordance with claim 1, wherein said chamber is cylindrical in shape.

7. A preset animal trap in accordance with claim 1, wherein said top end wall is removable.

8. A preset animal trap in accordance with claim 1, wherein said top end wall is at least partially transparent.

* * * * *